(12) United States Patent
Wetzel et al.

(10) Patent No.: US 11,867,296 B2
(45) Date of Patent: Jan. 9, 2024

(54) VALVE ASSEMBLY

(71) Applicant: Siemens Aktiengesellschaft, Munich (DE)

(72) Inventors: Martin Wetzel, Rastatt (DE); Nils Cooper, Muggensturm (DE); Armin Wiegand, Lichtenau-Muckenschopf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/839,146

(22) Filed: Jun. 13, 2022

(65) Prior Publication Data
US 2022/0397200 A1 Dec. 15, 2022

(30) Foreign Application Priority Data
Jun. 14, 2021 (EP) ..................................... 21179207

(51) Int. Cl.
*F16K 1/44* (2006.01)
*F16K 27/02* (2006.01)

(52) U.S. Cl.
CPC .............. *F16K 1/443* (2013.01); *F16K 27/02* (2013.01)

(58) Field of Classification Search
CPC .................................. F16K 1/443; F16K 27/02
See application file for complete search history.

(56) References Cited

U.S. PATENT DOCUMENTS

| | | | | |
|---|---|---|---|---|
| 156,769 A | * | 11/1874 | Cameron | F04B 39/1033 137/906 |
| 424,581 A | * | 4/1890 | Sickels | F16K 25/04 251/210 |
| 1,206,532 A | * | 11/1916 | Gray | F04B 49/00 417/252 |
| 1,356,925 A | * | 10/1920 | Knox | F01B 25/00 137/625.34 |
| 4,148,311 A | | 4/1979 | London | 128/142.2 |
| 6,386,234 B2 | * | 5/2002 | Sontag | F16K 1/443 137/625.34 |
| 6,457,444 B1 | | 10/2002 | LaDow | 123/90.11 |

(Continued)

FOREIGN PATENT DOCUMENTS

| | | | | |
|---|---|---|---|---|
| CN | 111075984 | | 4/2020 | ............. F16K 31/06 |
| DE | 10018757 | | 10/2001 | ............. G05D 16/06 |
| EP | 2 565 540 | | 3/2013 | ............. F23N 1/00 |

*Primary Examiner* — Daphne M Barry
(74) *Attorney, Agent, or Firm* — Slayden Grubert Beard PLLC

(57) ABSTRACT

A valve assembly (1) comprising: a common housing having a first side (8a), a second side (8b), an inlet port (2) and an outlet port (3); the valve assembly (1) comprising a first pair of valve members or poppets (4a, 4c) and a second pair of valve members or poppets (4b, 4d), a first pair of valve seats (5a, 5c) for cooperation with the first pair of valve members or poppets (4a, 4c), and a second pair of valve seats (5b, 5d) for cooperation with the second pair of valve members or poppets (4b, 4d); a central flow diverter (13c) disposed in between the first pair of valve members or poppets (4a, 4c) and the second pair of valve seats (5b, 5d), the central flow diverter (13c) defining a first side (11a) of the valve assembly (1) and a second side (11b) of the valve assembly (1).

13 Claims, 5 Drawing Sheets

(56) References Cited

U.S. PATENT DOCUMENTS

| | | | | |
|---|---|---|---|---|
| 7,000,635 B2* | 2/2006 | Erbe | ............... | F16K 1/44 |
| | | | | 137/625.36 |
| 7,624,755 B2* | 12/2009 | Benda | ............... | F16K 1/443 |
| | | | | 251/324 |
| 7,766,037 B2* | 8/2010 | Moenkhaus | ........ | F16K 31/0655 |
| | | | | 251/285 |
| 7,938,106 B2* | 5/2011 | Geskes | ............... | F02M 26/71 |
| | | | | 137/625.33 |
| 2001/0004903 A1 | 6/2001 | Ohmi | ............... | 137/613 |
| 2001/0025661 A1* | 10/2001 | Sontag | ............... | F16K 1/443 |
| | | | | 137/625.34 |
| 2006/0243334 A1* | 11/2006 | Brochhaus | ............... | F16K 1/44 |
| | | | | 137/625.33 |
| 2006/0272712 A1* | 12/2006 | Sontag | ............... | F16K 31/0655 |
| | | | | 137/554 |
| 2010/0117020 A1* | 5/2010 | Greif | ............... | F16K 1/443 |
| | | | | 251/367 |
| 2014/0053928 A1* | 2/2014 | Berger | ............... | F16K 1/44 |
| | | | | 137/614.11 |

* cited by examiner

VALVE ASSEMBLY

CROSS-REFERENCE TO RELATED APPLICATIONS

This application claims priority to EP Application No. 21179207.2 filed Jun. 14, 2021, the contents of which are hereby incorporated by reference in their entirety.

TECHNICAL FIELD

The present disclosure deals with valves. Various embodiments may include a gas valve assembly, e.g., a valve assembly for a combustion appliance.

BACKGROUND

Combustion appliances commonly comprise a burner chamber and one or more ducts in fluid communication with the burner chamber. The one or more ducts can comprise ducts for air and ducts for fuel. The fuel can be a combustible gas. One or more valves can act on the duct for fuel, thereby controlling a flow of fuel to the burner chamber. Likewise, one or more valves can act on the duct for air, thereby controlling a flow of air to the burner chamber.

A valve such as a gas valve can comprise more than one valve member or more than one poppet. That is, there can be more than one moveable member or more than one poppet acting on a flow of air or fuel through the valve. There can be a common actuator for selectively moving all valve members between a closed position and an open position. There can also be individual actuators, each individual actuator being coupled to a single valve member.

A valve can employ a plurality of valve members or a plurality of poppets in series and/or in parallel. Where a plurality of valve members is arranged in parallel, that arrangement can increase the cross section of the valve. A large cross section increases the maximum flow of air or the maximum flow of fuel through the valve. In other words, a plurality of parallel valve members yields an increase in maximum flow.

A valve having several valve members can involve a plurality of flow paths between the inlet port of the valve and the outlet port of the valve. Those flow paths can interfere with one another. A first flow path can, by way of example, cross a second flow path. There can also be vortices in a first flow path and those vortices may alter a flow along the second flow path.

Valves can include one or more ports for pressure sensors. A flow of fluid along the one or more fluid paths can then create a vortex at or near a port for a pressure sensor. Consequently, any readings obtained from a sensor at or near that port can be misleading and/or incorrect.

Valves assemblies with several valve members seem common in oxygen supply systems for aircraft. A patent U.S. Pat. No. 4,148,311A describes a common duct bifurcating into a first duct and a second duct. A first toggle valve acts on the first duct and a second toggle valve acts on the second duct. As the fluid leaves the valves, the two ducts merge again into a common duct. The common duct functions to supply a mask with oxygen. The flow paths along the first duct and along the second duct are largely separate. Consequently, the flow paths hardly interfere.

Arrangements with several ducts also seem common in the domain of semiconductor manufacturing. A patent application US2001/0004903A1 deals with a parallel divided flow-type fluid supply apparatus. The fluid supply assembly comprises a pressure regulator with an upstream side and with a downstream side. A plurality of ducts is disposed downstream of the pressure regulator such that a single duct from the regulator branches into the parallel flow ducts. The flow ducts are each associated with a flow control valve acting on the duct. A plurality of mass flow controllers is employed to control flow through the assembly. The flow paths follow the flow ducts. The flow paths are largely separate. Consequently, the flow paths hardly interfere.

In the domain of combustion appliances, a patent U.S. Pat. No. 6,457,444B1 describes a poly valve system for internal combustion engines. FIG. 1 of U.S. 6,457,444B shows a cylinder head having a plurality of bores. Intake valves and exhaust valves are associated with the bores of the cylinder head. The intake valves and the exhaust valves are in fluid communication with a cylinder. That is, the valves all connect to a single cylinder.

SUMMARY

The instant disclosure introduces a valve for a combustion appliance. The valve of the instant disclosure minimises interference between flow paths within the valve. For example, some embodiments include a valve assembly (1) comprising: a common housing having a first side (8a), a second side (8b), an inlet port (2), and an outlet port (3); the valve assembly (1) comprising a first pair of valve members or poppets (4a, 4c) and a second pair of valve members or poppets (4b, 4d), a first pair of valve seats (5a, 5c) for cooperation with the first pair of valve members or poppets (4a, 4c), and a second pair of valve seats (5b, 5d) for cooperation with the second pair of valve members or poppets (4b, 4d); a central flow diverter (13c) disposed in between the first pair of valve members or poppets (4a, 4c) and the second pair of valve seats (5b, 5d), the central flow diverter (13c) defining a first side (11a) of the valve assembly (1), the first side (11a) of the valve assembly (1) being disposed between the central flow diverter (13c) and the first side (8a) of the common housing, the central flow diverter (13c) defining a second side (11b) of the valve assembly (1), the second side (11b) of the valve assembly (1) being disposed between the central flow diverter (13c) and the second side (8b) of the common housing; the first pair of valve seats (5a, 5c) comprising a first valve seat (5a) disposed on the first side (11a) of the valve assembly (1); the second pair of valve seats (5b, 5d) comprising a second valve seat (5b) disposed on the first side (11a) of the valve assembly (1); and the central flow diverter (13c) being configured to: divert a first flow originating from the inlet port (2) and flowing through the first valve seat (5a) of the first pair of valve seats (5a, 5c) toward the second valve seat (5b) of the second pair of valve seats (5b, 5d).

In some embodiments, the central flow diverter (13c) being configured to: divert the first flow originating from the inlet port (2) and flowing through the first valve seat (5a) of the first pair of valve seats (5a, 5c) toward the second valve seat (5b) of the second pair of valve seats (5b, 5d) such that between the first valve seat (5a) and the second valve seat (5b) the first flow remains on the first side (11a) of the valve assembly (1).

In some embodiments, the first pair of valve members or poppets (4a, 4c) comprising a first valve member or first poppet (4a); wherein the central flow diverter (13c) is disposed adjacent to the first valve member or first poppet (4a); and the central flow diverter (13c) being configured to: cooperate with the first valve member or first poppet (4a) to divert the first flow originating from the inlet port (2) and flowing through the first valve seat (5a) of the first pair of valve seats (5a, 5c) toward the second valve seat (5b) of the second pair of valve seats (5b, 5d).

In some embodiments, the first pair of valve seats (5a, 5c) comprising a third valve seat (5c) disposed on the second side (11b) of the valve assembly (1); the second pair of valve seats (5b, 5d) comprising a fourth valve seat (5d) disposed on the second side (11b) of the valve assembly (1); and the central flow diverter (13c) being configured to: divert a second flow originating from the inlet port (2) and flowing through the third valve seat (5c) of the first pair of valve seats (5a, 5c) toward the fourth valve seat (5d) of the second pair of valve seats (5b, 5d).

In some embodiments, the central flow diverter (13c) being configured to: divert the second flow originating from the inlet port (2) and flowing through the third valve seat (5c) of the first pair of valve seats (5a, 5c) toward the fourth valve seat (5d) of the second pair of valve seats (5b, 5d) such that between the third valve seat (5c) and the fourth valve seat (5d) the second flow remains on the second side (11b) of the valve assembly (1).

In some embodiments, the first pair of valve members or poppets (4a, 4c) comprising a first valve member or first poppet (4a); wherein the central flow diverter (13c) is disposed adjacent to the first valve member or first poppet (4a); and the central flow diverter (13c) being configured to: cooperate with the first valve member or first poppet (4a) to divert the second flow originating from the inlet port (2) and flowing through the third valve seat (5c) of the first pair of valve seats (5a, 5c) toward the fourth valve seat (5d) of the second pair of valve seats (5b, 5d).

In some embodiments, the inlet port (2) and the outlet port (3) define a downstream direction from the inlet port (2) to the outlet port (3); and the second pair of valve seats (5b, 5d) is disposed downstream of the first pair of valve seats (5a, 5c).

In some embodiments, the inlet port (2) and the outlet port (3) define a downstream direction from the inlet port (2) to the outlet port (3); and the second pair of valve members or poppets (4b, 4d) is disposed downstream of the first pair of valve members or poppets (4a, 4c).

In some embodiments, the second pair of valve seats (5b, 5d) comprises a fourth valve seat (5d) disposed on the second side (11b) of the valve assembly (1); the second pair of valve seats (5b, 5d) comprises a downstream web (14b) mechanically connecting the second valve seat (5b) to the fourth valve seat (5d); and the central flow diverter (13c) is secured relative to the downstream web (14b).

In some embodiments, the central flow diverter (13c) comprises at least one of: a triangular prism having an edge, the edge pointing toward the inlet port (2), a cone having an apex, the apex pointing toward the inlet port (2).

In some embodiments, the valve assembly (1) further comprises an inlet flow diverter (13a) disposed in between the inlet port (2) and the first pair of valve members or poppets (4a, 4c).

In some embodiments, the inlet flow diverter (13a) is configured to: branch an inlet flow originating from the inlet port (2) into the first flow directed to the first side (11a) of the valve assembly (1) and into a second flow directed to the second side (11b) of the valve assembly (1).

In some embodiments, the first pair of valve seats (5a, 5c) comprises a third valve seat (5c) disposed on the second side (11b) of the valve assembly (1); the first pair of valve seats (5a, 5c) comprises an upstream web (14a) mechanically connecting the first valve seat (5a) to the third valve seat (5c); and the inlet flow diverter (13a) is secured relative to the upstream web (14a).

In some embodiments, the inlet flow diverter (13a) comprises at least one of: a triangular prism having an edge, the edge pointing toward the inlet port (2), a cone having an apex, the apex pointing toward the inlet port (2).

As another example, some embodiments include a combustion appliance comprising a valve assembly (1) as described herein.

BRIEF DESCRIPTION OF THE DRAWINGS

Various features are apparent to those skilled in the art from the following detailed description of the disclosed non-limiting embodiments. The drawings that accompany the detailed description can be briefly described as follows.

DETAILED DESCRIPTION

The present disclosure describes various valve assemblies having two pairs of valve members. The valve assembly also has two pairs of valve seats. The first pair of valve members is configured to cooperate with the first pair of valve seats. The second pair of valve members is configured to cooperate with the second pair of valve seats. A flow diverter and/or a baffle assembly is arranged inside the valve assembly. The flow diverter and/or the baffle assembly produces at least two separate flow paths through the valve assembly. A first flow path stays at a first side of the valve assembly. A second flow path stays at a second side of the valve assembly, the second side being opposite the first side.

Due to the flow diverter and/or due to the baffle assembly, the flow paths do not cross each other inside the valve assembly. Since the flow paths do not cross, there will be fewer vortices and less turbulence inside the valve assembly. Vortices and turbulence have a negative impact of the effectiveness of fluid flow through the valve. It follows that the valve assembly having a flow diverter and/or a baffle assembly confers benefits in terms of effective flow.

In some embodiments, the flow diverter is a central flow diverter. The central flow diverter is central to the valve assembly. The central flow diverter cooperates with one of the valve members of the first pair of valve members to alter a direction of a flow path through the valve assembly. The central flow diverter is ideally shaped so as to facilitate redirection of the flow path.

In some embodiments, the valve assembly comprises an inlet flow diverter. The inlet flow diverter is disposed at or near the inlet of the valve assembly. The inlet flow diverter cooperates with the first pair of valve seats to separate two flow paths through the valve assembly. The inlet flow diverter is ideally shaped so as to facilitate separation of the flow paths.

Figure 1:
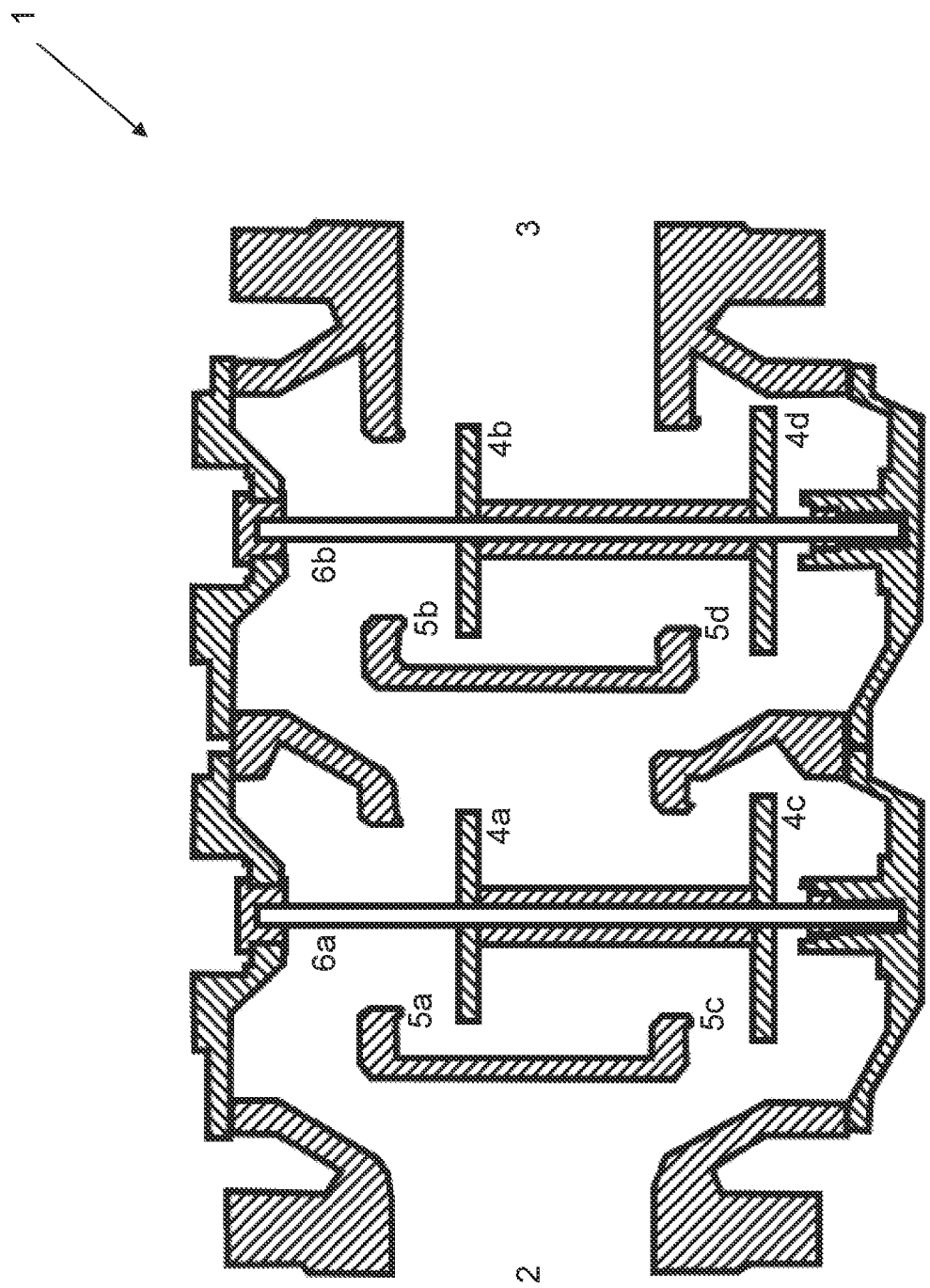
FIG. 1 shows a cross-sectional view of a valve assembly having a plurality of valve members according to the prior art.

FIG. 1 shows a valve assembly 1 having an inlet port 2 and an outlet port 3. A fluid path extends between the inlet port 2 and the outlet port 3 of the valve assembly 1. The valve assembly 1 comprises a first valve member 4a and a second valve member 4b. The valve assembly 1 also comprises a third valve member 4c and a fourth valve member 4d. The valve assembly 1 comprises a first valve seat 5a and a second valve seat 5b. The valve assembly 1 comprises a third valve seat 5c and a fourth valve seat 5d.

The first valve member 4a, the second valve member 4b, the third valve member 4c, and the fourth valve member 4d may be mutually different. Also, the first valve seat 5a, the second valve seat 5b, the third valve seat 5c, and the fourth valve seat 5d may be mutually different.

In some embodiments, a fluid such as air or a combustible gas flows through the valve assembly 1. The combustible can, by way of example, comprise methane and/or ethane and/or propane and/or butane. The combustible gas can also comprise mixtures of methane and ethane as well as mixtures of propane and butane.

In some embodiments, the molecules of the combustible gas comprise at least five percent of hydrogen molecules or at least ten percent of hydrogen molecules. It is even envisaged that the molecules of the combustible gas comprise at least twenty percent of hydrogen molecules. In some embodiments, the combustible gas is hydrogen or substantially is hydrogen. These lists of combustible gases are not exhaustive.

The first valve member 4a cooperates with the first valve seat 5a. That is, the first valve member 4a in its closed position abuts and/or attaches to the first valve seat 5a. The first valve member 4a in its open position is detached and/or separated from the first valve seat 5a.

The second valve member 4b cooperates with the second valve seat 5b. That is, the second valve member 4b in its closed position abuts and/or attaches to the second valve seat 5b. The second valve member 4b in its open position is detached and/or separated from the second valve seat 5b.

The third valve member 4c cooperates with the third valve seat 5c. That is, the third valve member 4c in its closed position abuts and/or attaches to the third valve seat 5c. The third valve member 4c in its open position is detached and/or separated from the third valve seat 5c.

The fourth valve member 4d cooperates with the fourth valve seat 5d. That is, the fourth valve member 4d in its closed position abuts and/or attaches to the fourth valve seat 5d. The fourth valve member 4d in its open position is detached and/or separated from the fourth valve seat 5d.

The inlet port 2 and the outlet port 3 define a direction of flow from the inlet port 2 to the outlet port 3. The inlet port 2 and the outlet port 3 thus define an upstream direction and/or an upstream position. Likewise, the inlet port 2 and the outlet port 3 thus define a downstream direction and/or a downstream position. The downstream direction and the upstream direction are opposite directions.

The first valve member 4a is arranged upstream of the second valve member 4b. Likewise, the first valve seat 5a is disposed upstream of the second valve seat 5b. The third valve member 4c is arranged upstream of the fourth valve member 4d. Likewise, the third valve seat 5c is disposed upstream of the fourth valve seat 5d.

In some embodiments, the first valve member 4a comprises a first poppet. In some embodiments, the second valve member 4b comprises a second poppet. In some embodiments, the third valve member 4c comprises a third poppet. In some embodiments, the fourth valve member 4d comprises a fourth poppet. The first poppet 4a, the second poppet 4b, the third poppet 4c, and the fourth poppet 4d may be mutually different.

In some embodiments, the first valve seat 5a comprises a first conical valve seat 5a. In some embodiments, the second valve seat 5b comprises a second conical valve seat 5b. In some embodiments, the third valve seat 5c comprises a third conical valve seat 5c. In some embodiments, the fourth valve seat 5d comprises a fourth conical valve seat 5d.

A first valve stem 6a mechanically couples to the first valve member or to the first poppet 4a. That is, the first valve member or the first poppet 4a is secured relative to the first valve stem 6a. In some embodiments, the first valve member or the first poppet 4a mechanically connects to the first valve stem 6a. The first valve member or the first poppet 4a can, by way of non-limiting example, be bolted to the first valve stem 6a. The first valve member or the first poppet 4a can, by way of another non-limiting example, be press-fitted to the first valve stem 6a. In some embodiments, first valve member or the first poppet 4a and the first valve stem 6a need not be joined but form a single piece.

The first valve stem 6a also mechanically couples to the third valve member or to the third poppet 4c. That is, the third valve member or the third poppet 4c is secured relative to the first valve stem 6a. In some embodiments, the third valve member or the third poppet 4c mechanically connects to the first valve stem 6a. The third valve member or the third poppet 4c can, by way of non-limiting example, be bolted to the first valve stem 6a. The third valve member or the third poppet 4c can, by way of another non-limiting example, be press-fitted to the first valve stem 6a. In some embodiments, third valve member or the third poppet 4c and the first valve stem 6a need not be joined but form a single piece.

A second valve stem 6b mechanically couples to the second valve member or to the second poppet 4b. That is, the second valve member or the second poppet 4b is secured relative to the second valve stem 6b. In some embodiments, the second valve member or the second poppet 4b mechanically connects to the second valve stem 6b. The second valve member or the second poppet 4b can, by way of non-limiting example, be bolted to the second valve stem 6b. The second valve member or the second poppet 4b can, by way of another non-limiting example, be press-fitted to the second valve stem 6b. In some embodiments, second valve member or the second poppet 4b and the second valve stem 6b need not be joined but form a single piece. The second valve stem 6b also mechanically couples to the fourth valve member or to the fourth poppet 4d. That is, the fourth valve member or the fourth poppet 4d is secured relative to the second valve stem 6b. In some embodiments, the fourth valve member or the fourth poppet 4d mechanically connects to the second valve stem 6b. The fourth valve member or the fourth poppet 4d can, by way of non-limiting example, be bolted to the second valve stem 6b. The fourth valve member or the fourth poppet 4d can, by way of another non-limiting example, be press-fitted to the second valve stem 6b. In some embodiments, fourth valve member or the fourth poppet 4d and the second valve stem 6b need not be joined but form a single piece.

In some embodiments, the first valve stem 6a comprises a first valve rod. In some embodiments, the second valve stem 6b comprises a second valve rod.

In some embodiments, the first valve stem 6a couples to a first actuator such as a first stepper motor or a first hydraulic actuator or a first solenoid actuator. The first actuator functions to selectively move the first valve stem 6a and the first valve member 4a between the closed position and the open position. The first actuator also functions to selectively move the first valve stem 6a and the third valve member 4c between the closed position and the open position. In some embodiments, the first actuator functions to continuously move the first valve stem 6a and the first valve member 4a between the closed and open positions. In some embodiments, the first actuator functions to continuously move the first valve stem 6a and the third valve member 4c between the closed and open positions.

A first signal such as an electric current between four and twenty Milliamperes can be used to set a position of the first actuator. The first signal can, by way of example, also be a first signal between zero and five Volts. The first actuator preferably provides terminals affording application of the first signal.

In some embodiments, the second valve stem 6b couples to a second actuator such as a second stepper motor or a second hydraulic actuator or a second solenoid actuator. The second actuator functions to selectively move the second valve stem 6b and the second valve member 4b between the closed position and the open position. The second actuator also functions to selectively move the second valve stem 6b and the fourth valve member 4d between the closed position and the open position. In some embodiments, the second actuator functions to continuously move the second valve stem 6b and the second valve member 4b between the closed and open positions. In some embodiments, the second actuator functions to continuously move the second valve stem 6b and the fourth valve member 4d between the closed and open positions.

A second signal such as an electric current between four and twenty Milliamperes can be used to set a position of the second actuator. The second signal can, by way of example, also be a second signal between zero and five Volts. In some embodiments, the second actuator provides terminals affording application of the second signal.

The first, second, third, and fourth valve members 4a-4d can also be actuated by a common actuator. That is, the first actuator is the same as the second actuator.

A common signal such as an electric current between four and twenty Milliamperes can be used to set a position of the common actuator. The common signal can, by way of example, also be a common signal between zero and five Volts. In some embodiments, the common actuator provides terminals affording application of the common signal.

FIG. 1 shows a valve assembly 1 having a first valve member 4a, a second valve member 4b, a third valve member 4c, and a fourth valve member 4d. In some embodiments, the valve assembly 1 comprises more than four valve members 4a-4d and more than four valve seats 5a-5d. The valve assembly 1 can, by way of example, comprise eight or more valve members. Each valve member may be associated with a valve seat of the valve assembly 1. The valve assembly 1 can, by way of another example, comprise twelve or more valve members. Each valve member may be associated with a valve seat of the valve assembly 1.

The first and third valve members 4a, 4c of the valve assembly 1 are disposed in parallel. The fluid path between the inlet port 2 and the outlet port 3 will close if both the first and third valve members 4a, 4c close. The fluid path will remain open so long as at least one of the first and third valve members 4a, 4c of the valve assembly 1 are in their open positions. The parallel valve members 4a, 4c increase the cross-section of the valve assembly 1.

In some embodiments, the first valve member 4a mechanically couples to the third valve member 4c. The first valve member 4a and the third valve member 4c may be rigidly connected. In some embodiments, the first valve member 4a and the third valve member 4c even form a single piece. The first valve member 4a closes when the third valve member 4c closes, and vice versa. Likewise, the first valve member 4a opens when the third valve member 4c opens, and vice versa.

The second and fourth valve members 4b, 4d of the valve assembly 1 are disposed in parallel. The fluid path between the inlet port 2 and the outlet port 3 will close if both the second and fourth valve members 4b, 4d close. The fluid path will remain open so long as at least one of the second and fourth valve members 4b, 4d of the valve assembly 1 are in their open positions. The parallel valve members 4b, 4d increase the cross-section of the valve assembly 1.

In some embodiments, the second valve member 4b mechanically couples to the fourth valve member 4d. The second valve member 4b and the fourth valve member 4d may be rigidly connected. In a special embodiment, the second valve member 4b and the fourth valve member 4d even form a single piece. The second valve member 4b closes when the fourth valve member 4d closes, and vice versa. Likewise, the second valve member 4b opens when the fourth valve member 4d opens, and vice versa.

Where the first and third valve members 4a, 4c are rigidly coupled, the first and second valve members 4a, 4b are disposed in series. The fluid path between the inlet port 2 and the outlet port 3 will close if at least one of the first and second valve members 4a, 4b closes. The fluid path will remain open so long as the first and second valve members 4a, 4b of the valve assembly 1 are in their open positions.

Where the second and fourth valve members 4b, 4d are rigidly coupled, the third and fourth valve members 4c, 4d of the valve assembly 1 are disposed in series. The fluid path between the inlet port 2 and the outlet port 3 will close if at least one of the third and fourth valve members 4c, 4d closes. The fluid path will remain open so long as the third and fourth valve members 4c, 4d of the valve assembly 1 are in their open positions.

Figure 2:
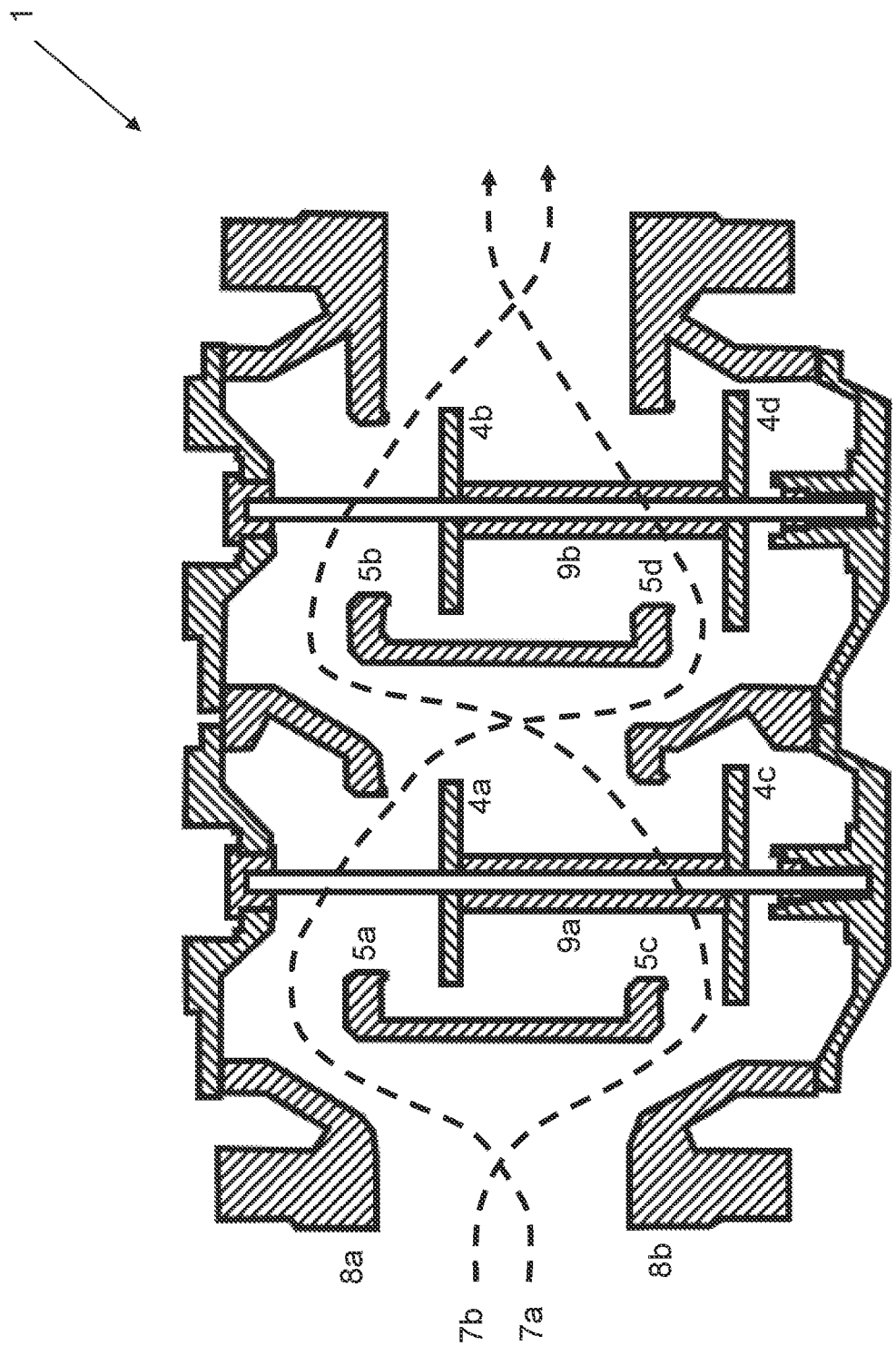
FIG. 2 illustrates flow paths within a valve assembly having a plurality of valve members incorporating teachings of the present disclosure.

Now turning to FIG. 2, two flow paths 7a, 7b through the valve assembly 1 are illustrated. The first flow path 7a may be different from the second flow path 7b. The valve assembly 1 comprises a common housing having a first side 8a and a second side 8b. The first side 8a of the common housing of the valve assembly 1 is different from the second side 8b of the common housing of the valve assembly 1. The first side 8a of the common housing of the valve assembly 1 may be disposed opposite the second side 8b of the common housing of the valve assembly 1.

A first connector 9a mechanically connects the first valve member or first poppet 4a and the third valve member or third poppet 4c. A second connector 9b mechanically connects the second valve member or second poppet 4b and the fourth valve member or fourth poppet 4d. The first connector 9a may be different from the second connector 9b.

In some embodiments, the first connector 9a comprises a first cylindrical portion. The first cylindrical portion envelops a portion of the first valve stem 6a. The first cylindrical portion can, by way of non-limiting examples, be press-fitted or shrink-fitted to the first valve stem 6a. In some embodiments, the first cylindrical portion can be press-fitted or shrink-fitted to the portion of the first valve stem 6a.

In some embodiments, the second connector 9b comprises a second cylindrical portion. The second cylindrical portion envelops a portion of the second valve stem 6b. The second cylindrical portion can, by way of non-limiting examples, be press-fitted or shrink-fitted to the second valve stem 6b. In some embodiments, the second cylindrical portion can be press-fitted or shrink-fitted to the portion of the second valve stem 6b.

The valve assembly 1 comprises a pair of upstream valve seats 5a, 5c. The pair of upstream valve seats 5a, 5c is disposed closer to the inlet port 2 than to the outlet port 3. The pair of upstream valve seats 5a, 5c comprises the first valve seat 5a and the third valve seat 5c. The valve assembly 1 comprises a pair of downstream valve seats 5b, 5d. The pair of downstream valve seats 5b, 5d is disposed closer to the outlet port 3 than to the inlet port 2. The pair of downstream valve seats 5b, 5d comprises the second valve seat 5b and the fourth valve seat 5d.

The valve assembly 1 comprises a pair of upstream valve members 4a, 4c. The pair of upstream valve members 4a, 4c is disposed closer to the inlet port 2 than to the outlet port 3. The pair of upstream valve members 4a, 4c comprises the first valve member or first poppet 4a and the third valve member or third poppet 4c. The valve assembly 1 comprises a pair of downstream valve members 4b, 4d.

The pair of downstream valve members 4b, 4d is disposed closer to the outlet port 3 than to the inlet port 2. The pair of downstream valve members 4b, 4d comprises the second valve member or second poppet 4b and the fourth valve member or fourth poppet 4d.

A fluid such as a gaseous fluid enters the valve assembly via the inlet port 2. The flow through the valve assembly 1 then branches into two flow paths 7a, 7b. The first flow path 7a reaches the first valve seat 5a. After flowing through the third valve seat 5a, the first flow path 7a bypasses the first valve member or first poppet 4a. The first flow path 7a then changes from the first side 8a of the common housing of the valve assembly 1 to the second side 8b of the common housing of the valve assembly 1. After changing sides, the flow path 7a reaches and flows through the fourth valve seat 5d. The first flow path 7a then flows between the second valve member or second poppet 4b and the fourth valve member or fourth poppet 4d. In so doing, the first flow path 7a can bypass the second connector 9b. The first flow path 7a can, by way of non-limiting example, bypass the second connector 9b sideways. The first flow path 7a eventually reaches the outlet port 3.

The second flow path 7b reaches the third valve seat 5c. After flowing through the third valve seat 5c, the second flow path 7b bypasses the third valve member or first poppet 4c. The second flow path 7b then changes from the second side 8b of the common housing of the valve assembly 1 to the first side 8a of the common housing of the valve assembly 1. After changing sides, the second flow path 7b reaches and flows through the second valve seat 5b. The second flow path 7b continues between the second valve seat 5b and the second valve member or second poppet 4b. The second flow path 7b eventually reaches the outlet port 3.

The first flow path 7a crosses the second flow path 7b as the flow paths 7a, 7b change sides 8a, 8b. The first flow path 7a can also partially cross the second flow path 7b as the flow paths 7a, 7b change sides 8a, 8b. A partial crossing implies that a first portion of the first flow path 7a crosses a first portion of the second flow path 7b. A partial crossing also implies that a second portion of the first flow path 7a does not cross a second portion of the second flow path 7b.

FIG. 2 shows that the first flow path 7a crosses the second flow path 7b between the first connector 9a and the downstream valve seats 5b, 5d.

The crossing of the flow paths 7a, 7b causes vortices and turbulence in the region where the first flow path 7a crosses the second flow path 7b. The vortices and the turbulence have a negative impact of the amount of flow between the inlet port 2 and the outlet port 3 of the valve assembly 1. That is, the transport of fluid through the valve assembly 1 can become less effective.

Figure 3:
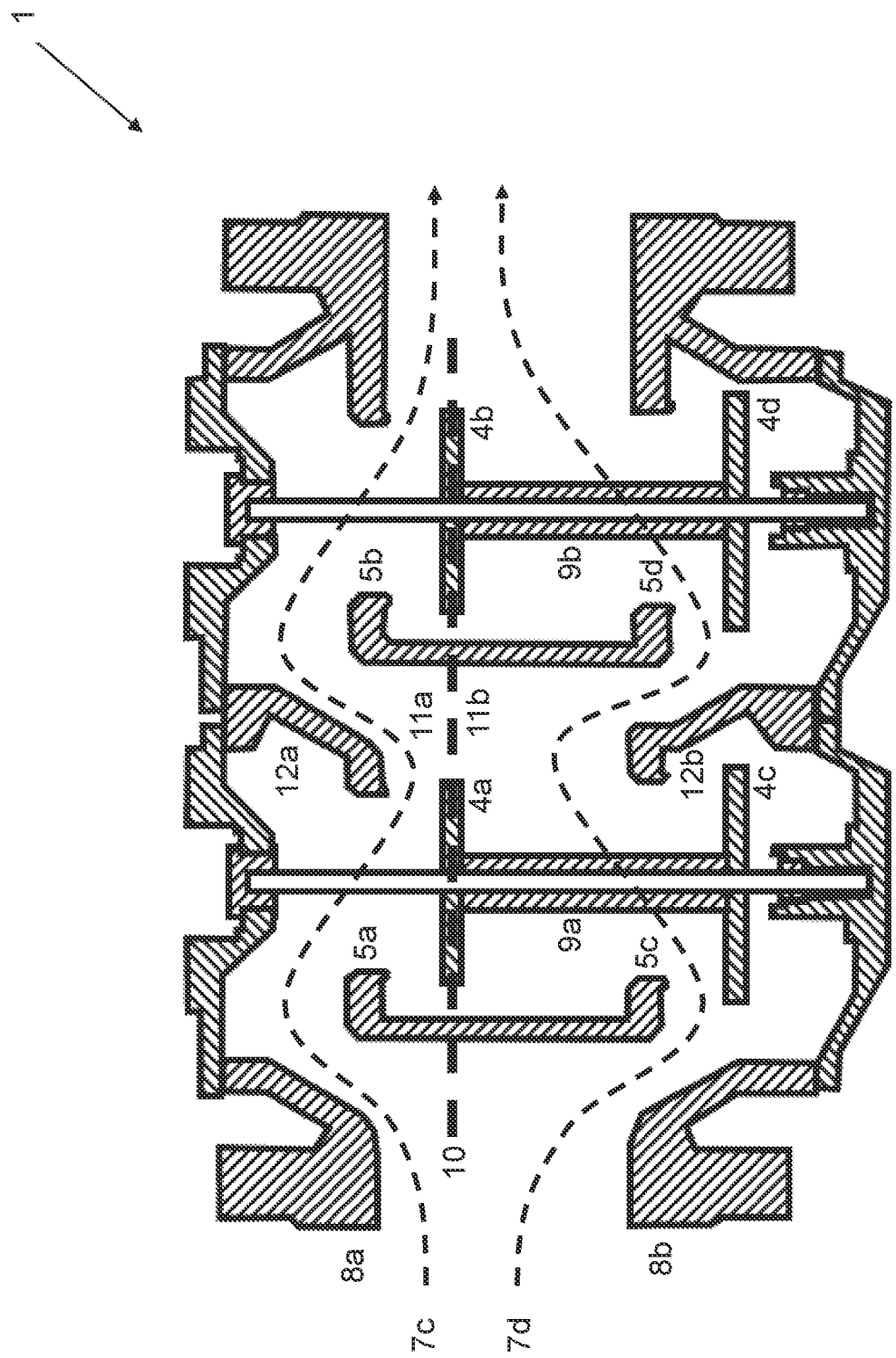
FIG. 3 shows a cross-sectional view of a valve assembly having a plurality of valve members and a baffle assembly incorporating teachings of the present disclosure.

Now referring to FIG. 3, a valve assembly 1 having a baffle assembly 10 is illustrated. The baffle assembly 10 divides the valve assembly 1 into a first side 11a and a second side 11b. The first side 11a of the valve assembly 1 points to in the direction of the first side 8a of the common housing. In some embodiments, the first side 11a of the valve assembly 1 is disposed adjacent to the first side 8a of the common housing. The second side 11b of the valve assembly 1 points to in the direction of the second side 8b of the common housing. In some embodiments, the second side 11b of the valve assembly 1 is disposed adjacent to the second side 8b of the common housing.

The first side 11a of the valve assembly 1 is different from the second side 11b of the valve assembly 1. The first side 11a of the valve assembly 1 and the second side 11b of the valve assembly 1 are disposed on opposite sides of the baffle assembly 10. In some embodiments, the baffle assembly 10 comprises one or more flow diverters. In some embodiments, the baffle assembly 10 is a baffle.

FIG. 3 shows a first protrusion 12a. The first protrusion 12a protrudes from the first side 8a of the common housing of the valve assembly 1. The first protrusion 12a may be arranged downstream of the first valve member or first poppet 4a. The first protrusion 12a may be arranged upstream of the second valve member or second poppet 4b. Likewise, the first protrusion 12a may be arranged downstream of the first connector 9a. The first protrusion 12a may be arranged upstream of the second connector 9b. In some embodiments, the first protrusion 12a mechanically connects to the first valve seat 5a.

FIG. 3 shows a second protrusion 12b. The second protrusion 12b protrudes from the second side 8b of the common housing of the valve assembly 1. The second protrusion 12b may be arranged downstream of the third valve member or third poppet 4c. The second protrusion 12b may be arranged upstream of the fourth valve member or fourth poppet 4d. Likewise, the second protrusion 12b may be arranged downstream of the first connector 9a. The second protrusion 12b may be arranged upstream of the second connector 9b. In some embodiments, the second protrusion 12b mechanically connects to the third valve seat 5c. The first protrusion 12a is different from the second protrusion 12b.

In operation, a fluid such as a gaseous fluid enters the valve assembly via the inlet port 2. The flow through the valve assembly 1 then branches into a third flow path 7c and a fourth flow path 7d. The third flow path 7c reaches the first valve seat 5a. After flowing through the first valve seat 5a, the third flow path 7c bypasses the first protrusion 12a. The third flow path 7c flows through a channel formed by the first protrusion 12a and the baffle assembly 10.

In so doing, the baffle assembly 10 directs the third flow path 7c toward the second valve seat 5b. The third flow path 7c then flows through the second valve seat 5b which is arranged downstream of the first protrusion 12a. After flowing through the second valve seat 5b, the third flow path 7c reaches the second valve member or second poppet 4b. The third flow path 7c eventually reaches the outlet port 3.

The fourth flow path 7d reaches the third valve seat 5c. After flowing through the third valve seat 5c, the fourth flow path 7d bypasses the second protrusion 12b. The fourth flow path 7d flows through a channel formed by the second protrusion 12b and the baffle assembly 10. In so doing, the baffle assembly 10 directs the fourth flow path 7d toward the fourth valve seat 5d.

The fourth flow path 7d then flows through the fourth valve seat 5d which is arranged downstream of the second protrusion 12b. After flowing through the fourth valve seat 5d, the fourth flow path 7d reaches the fourth valve member or fourth poppet 4d. The fourth flow path 7d continues between the second valve member or second poppet 4b and the fourth valve member or fourth poppet 4d. In so doing, the fourth flow path 7d can bypass the second connector 9b. The fourth flow path 7d can, by way of non-limiting example, bypass the second connector 9b sideways. The fourth flow path 7d eventually reaches the outlet port 3.

Figure 4:
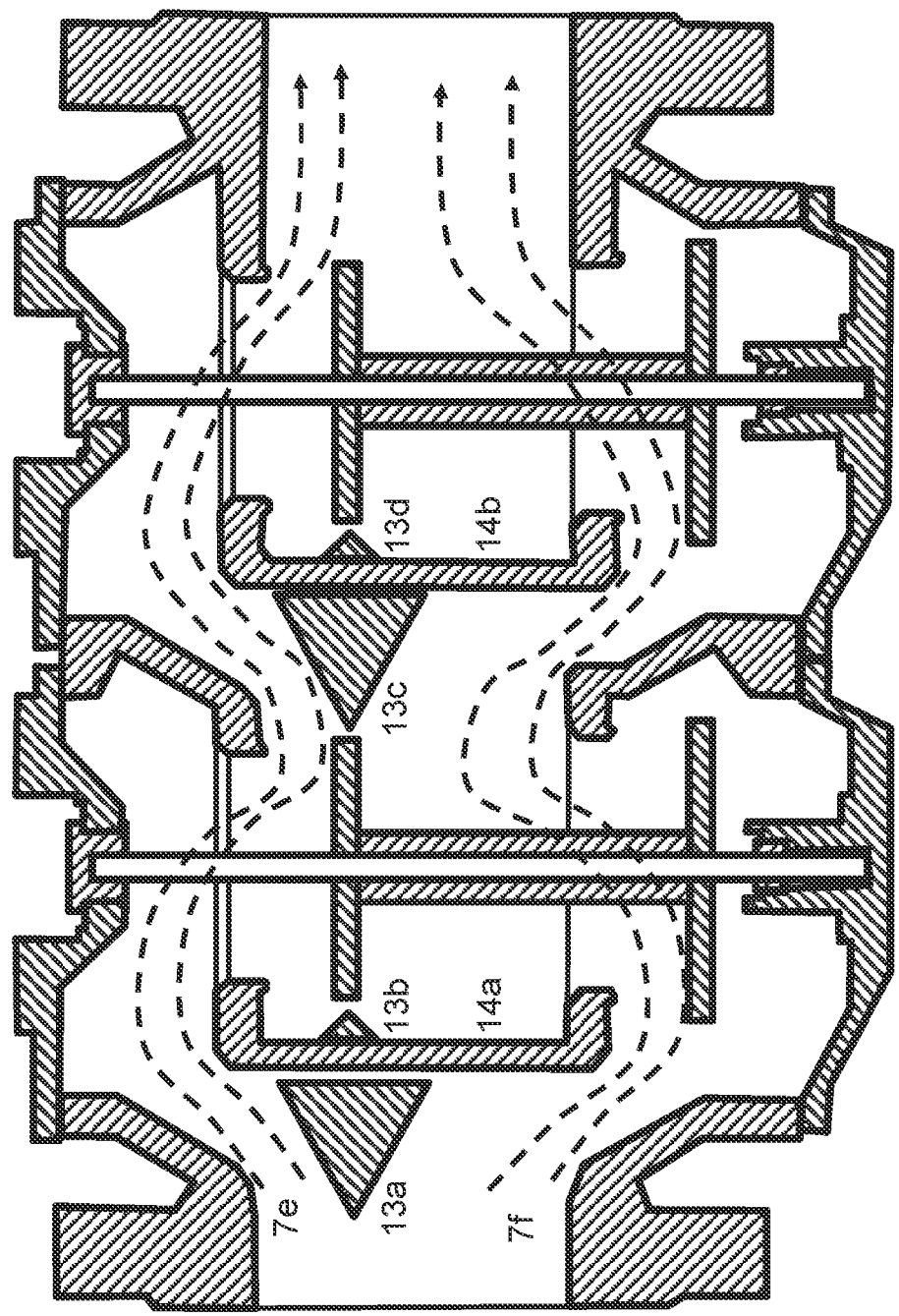
FIG. 4 is a cross-sectional view of a valve assembly having a plurality of valve members and having segregated flow paths incorporating teachings of the present disclosure.

The third flow path 7c is different from the fourth flow path 7d. Due to the baffle assembly 10, the third flow path 7c does not cross the fourth flow path 7d. More specifically, the third flow path 7c as shown in FIG. 4 does not cross the fourth flow path 7d between the first connector 9a and the downstream valve seats 5b, 5d. Between the first valve seat 5a and the second valve member or second poppet 4b, the third flow path 7c stays on the first side 11a. More specifically, the third flow path 7c stays on the first side 11a of the valve assembly 1. Between the third valve seat 5c and the fourth valve member or fourth poppet 4d, the fourth flow path 7d stays on the second side 11b. More specifically, the fourth flow path 7d stays on the second side 11b of the valve assembly 1.

Since the third flow path 7c does not cross the fourth flow path 7d, the valve assembly 1 having the baffle assembly 10 involves fewer vortices. The valve assembly 1 also involves less turbulence. More specifically, the baffle assembly 10 leads to fewer vortices between the first connector 9a and the second 5b and fourth 5d valve seats. The baffle assembly 10 also leads to less turbulence between the first connector 9a and the second 5b and fourth 5d valve seats. Vortices and the turbulence have a negative impact of the amount of flow between the inlet port 2 and the outlet port 3 of the valve assembly 1. That is, the baffle assembly 10 results in more effective transport of fluid through the valve assembly 1.

FIG. 4 shows a first flow diverter 13a. In some embodiments, the first flow diverter 13a is a flow diverter of the baffle assembly 10. In some embodiments, the first flow diverter 13a comprises a first prism-shaped flow diverter. In some embodiments, the first flow diverter 13a comprises a first conical flow diverter. In some embodiments, the first flow diverter 13a comprises a first cylindrical flow diverter. In some embodiments, the first flow diverter 13a comprises a disc. In some embodiments, the first flow diverter 13a comprises a panel. In some embodiments, the first flow diverter 13a comprises a first baffle member.

In some embodiments, the first flow diverter 13a is manufactured using an additive manufacturing technique such as three-dimensional printing. In some embodiments, the first flow diverter 13a is indirectly manufactured using an additive manufacturing technique such as three-dimensional printing. Manufacture of the first flow diverter 13a can, in a special embodiment, involve selective laser sintering.

FIG. 4 also shows a second flow diverter 13b. In some embodiments, the second flow diverter 13b is a flow diverter of the baffle assembly 10. The second flow diverter 13b is disposed downstream of the first flow diverter 13a. In some embodiments, the second flow diverter 13b comprises a second prism-shaped flow diverter.

In some embodiments, the second flow diverter 13b comprises a second conical flow diverter. In some embodiments, the second flow diverter 13b comprises a second cylindrical flow diverter. In some embodiments, the second flow diverter 13b comprises a disc. In some embodiments, the second flow diverter 13b comprises a panel. In some embodiments, the second flow diverter 13b comprises a second baffle member.

In some embodiments, the second flow diverter 13b is manufactured using an additive manufacturing technique such as three-dimensional printing. In some embodiments, the second flow diverter 13b is indirectly manufactured using an additive manufacturing technique such as three-dimensional printing. Manufacture of the second flow diverter 13b can involve selective laser sintering.

The first flow diverter 13a and the second flow diverter 13b may be secured relative to a first web 14a. The first web 14a connects the first valve seat 5a to the third valve seat 5c. In some embodiments, the first flow diverter 13a and the second flow diverter 13b are mounted to the first web 14a. In some embodiments, the first flow diverter 13a and the second flow diverter 13b are mounted on opposite sides the first web 14a.

FIG. 4 still shows a third flow diverter 13c. In some embodiments, the third flow diverter 13c is a flow diverter of the baffle assembly 10. The third flow diverter 13c is disposed downstream of the second flow diverter 13b. In some embodiments, the third flow diverter 13c comprises a third prism-shaped flow diverter. In some embodiments, the third flow diverter 13c comprises a third conical flow diverter. In some embodiments, the third flow diverter 13c comprises a third cylindrical flow diverter. In some embodiments, the third flow diverter 13c comprises a disc. In some embodiments, the third flow diverter 13c comprises a panel. In some embodiments, the third flow diverter 13c comprises a third baffle member.

In some embodiments, the third flow diverter 13c is manufactured using an additive manufacturing technique such as three-dimensional printing. In some embodiments, the third flow diverter 13c is indirectly manufactured using an additive manufacturing technique such as three-dimensional printing. Manufacture of the third flow diverter 13c can involve selective laser sintering.

In some embodiments, the first flow diverter 13a and the third flow diverter 13c have similar shapes. In some embodiments, the first flow diverter 13a and the third flow diverter 13c have the same shape.

FIG. 4 still further shows a fourth flow diverter 13d. In some embodiments, the fourth flow diverter 13d is a flow diverter of the baffle assembly 10. The fourth flow diverter 13d is disposed downstream of the third flow diverter 13c. In some embodiments, the fourth flow diverter 13d comprises a fourth prism-shaped flow diverter. In some embodiments, the fourth flow diverter 13d comprises a fourth conical flow diverter. In some embodiments, the fourth flow diverter 13d is a fourth cylindrical flow diverter. In some embodiments, the fourth flow diverter 13d comprises a disc. In some embodiments, the fourth flow diverter 13d comprises a panel. In some embodiments, the fourth flow diverter 13d comprise a fourth baffle member.

In some embodiments, the fourth flow diverter 13d is manufactured using an additive manufacturing technique such as three-dimensional printing. In some embodiments, the fourth flow diverter 13d is indirectly manufactured using an additive manufacturing technique such as three-dimensional printing. Manufacture of the fourth flow diverter 13d can involve selective laser sintering.

In some embodiments, the second flow diverter 13b and the fourth flow diverter 13d have similar shapes. In some embodiments, the second flow diverter 13b and the fourth flow diverter 13d have the same shape.

The third flow diverter 13c and the fourth flow diverter 13d may be secured relative to a second web 14b. The second web 14b connects the second valve seat 5b to the fourth valve seat 5d. The second web 14b is different from the first web 14a. It is envisaged that the third flow diverter 13c and the fourth flow diverter 13d are mounted to the second web 14b. In some embodiments, the third flow diverter 13c and the fourth flow diverter 13d are mounted on opposite sides the second web 14b.

The first flow diverter 13a, the second flow diverter 13b, the third flow diverter 13c, and the fourth flow diverter 13d are mutually different.

The first flow diverter 13a may be disposed between the first side 11a and the second side 11b of the valve assembly 1. The second flow diverter 13b may be disposed between the first side 11a and the second side 11b of the valve assembly 1. The third flow diverter 13c may be disposed between the first side 11a and the second side 11b of the valve assembly 1. The fourth flow diverter 13d may be disposed between the first side 11a and the second side 11b of the valve assembly 1.

A fluid such as a gaseous fluid enters the valve assembly via the inlet port 2. The first flow diverter 13a then branches the flow into a fifth flow path 7e and a sixth flow path 7f. The fifth flow path 7e reaches the first valve seat 5a. After flowing through the first valve seat 5a, the fifth flow path 7e bypasses the first protrusion 12a. The fifth flow path 7e flows through a channel formed by the first protrusion 12a and the third flow diverter 13c. In so doing, the third flow diverter 13c directs the fifth flow path 7e toward the second valve seat 5b. The fifth flow path 7e then flows through the second valve seat 5b which is arranged downstream of the first protrusion 12a. After flowing through the second valve seat 5b, the fifth flow path 7e reaches the second valve member or second poppet 4b. The fifth flow path 7e eventually reaches the outlet port 3.

The sixth flow path 7f reaches the third valve seat 5c. After flowing through the third valve seat 5c, the sixth flow path 7f bypasses the second protrusion 12b. The sixth flow path 7f flows through a channel formed by the second protrusion 12b and the third flow diverter 13c. In so doing, the third flow diverter 13c directs the sixth flow path 7f toward the fourth valve seat 5d. The sixth flow path 7f then flows through the fourth valve seat 5d which is arranged downstream of the second protrusion 12b. After flowing through the fourth valve seat 5d, the sixth flow path 7f reaches the fourth valve member or fourth poppet 4d. The sixth flow path 7f continues between the second valve member or second poppet 4b and the fourth valve member or fourth poppet 4d. In so doing, the sixth flow path 7f can bypass the second connector 9b. The sixth flow path 7f can, by way of non-limiting example, bypass the second connector 9b sideways. The sixth flow path 7f eventually reaches the outlet port 3.

The fifth flow path 7e is different from the sixth flow path 7f. Due to the third flow diverter 13c, the fifth flow path 7e does not cross the sixth flow path 7f. More specifically, the fifth flow path 7e as shown in FIG. 4 does cross not the sixth flow path 7f between the first connector 9a and the second web 14b. Between the first valve seat 5a and the second valve member or second poppet 4b, the fifth flow path 7e stays on the first side 11a. More specifically, the fifth flow path 7e stays on the first side 11a of the valve assembly 1. Between the third valve seat 5c and the fourth valve member or fourth poppet 4d, the sixth flow path 7f stays on the second side 11b. More specifically, the sixth flow path 7f stays on the second side 11b of the valve assembly 1.

Since the fifth flow path 7e does not cross the sixth flow path 7f, the valve assembly 1 having the third flow diverter 13c involves fewer vortices. The valve assembly 1 also involves less turbulence. More specifically, the third flow diverter 13c leads to fewer vortices between the first connector 9a and the second web 14b. The third flow diverter 13c also leads to less turbulence between the first connector 9a and the second web 14b. Vortices and the turbulence have a negative impact of the amount of flow between the inlet port 2 and the outlet port 3 of the valve assembly 1. That is, the third flow diverter 13c results in more effective transport of fluid through the valve assembly 1.

Figure 5:
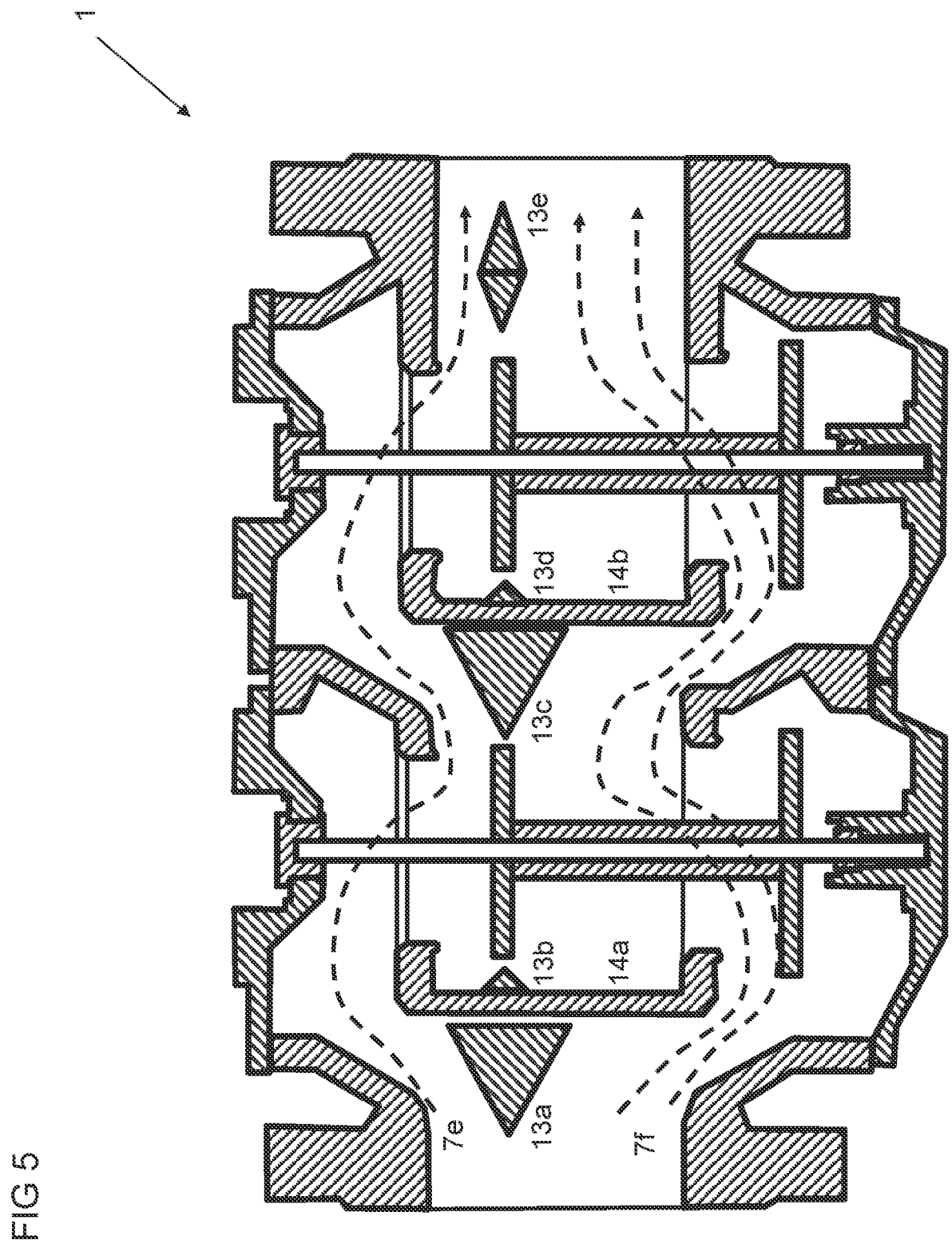
FIG. 5 is a cross-sectional view of a valve assembly having a plurality of valve members and having an additional flow diverter incorporating teachings of the present disclosure.

FIG. 5 still further shows a fifth flow diverter 13e. In some embodiments, the fifth flow diverter 13e is a flow diverter of the baffle assembly 10. The fifth flow diverter 13e is disposed downstream of the fifth flow diverter 13d. In some embodiments, the fifth flow diverter 13e comprises a fifth prism-shaped flow diverter. In some embodiments, the fifth flow diverter 13e comprises one or more fifth conical flow diverters. In some embodiments, the fifth flow diverter 13e comprises a disc. In some embodiments, the fifth flow diverter 13e comprises a panel. In some embodiments, the fifth flow diverter 13e comprises a fifth baffle member.

In some embodiments, the fifth flow diverter 13e is manufactured using an additive manufacturing technique such as three-dimensional printing. In some embodiments, the fifth flow diverter 13e is indirectly manufactured using an additive manufacturing technique such as three-dimensional printing. Manufacture of the fifth flow diverter 13e can involve selective laser sintering.

The fifth flow diverter 13e inhibits a crossing of the flow paths 7e, 7f at or near the outlet port 3 of the valve assembly 1.

In some embodiments, the first side (8a) of the common housing comprises a first end of the common housing. In some embodiments, the second side (8b) of the common housing comprises a second end of the common housing. The second end of the common housing is different from the first end of the common housing. The second end of the common housing is disposed opposite the first end of the common housing.

In some embodiments, the valve assembly (1) comprises a first pair of valve seats (5a, 5c) cooperating with the first pair of valve members or poppets (4a, 4c), and a second pair of valve seats (5b, 5d) cooperating with the second pair of valve members or poppets (4b, 4d).

In some embodiments, the central flow diverter (13c) directs a first flow originating from the inlet port (2) and flowing through the first valve seat (5a) of the first pair of valve seats (5a, 5c) toward the second valve seat (5b) of the second pair of valve seats (5b, 5d).

In some embodiments, the central flow diverter (13c) is configured to redirect a first flow originating from the inlet port (2) and flowing through the first valve seat (5a) of the first pair of valve seats (5a, 5c) toward the second valve seat (5b) of the second pair of valve seats (5b, 5d).

In some embodiments, the central flow diverter (13c) redirects a first flow originating from the inlet port (2) and flowing through the first valve seat (5a) of the first pair of valve seats (5a, 5c) toward the second valve seat (5b) of the second pair of valve seats (5b, 5d).

In some embodiments, the central flow diverter (13c) is configured to divert a first flow originating from the inlet port (2) and flowing through the first valve seat (5a) of the first pair of valve seats (5a, 5c) toward the second valve seat (5b) of the second pair of valve seats (5b, 5d) such that the first flow eventually reaches the outlet port (3).

In some embodiments, the central flow diverter (13c) is a central baffle member.

In some embodiments, the first flow is a first flow of a fluid such as a gaseous fluid. The valve assembly (1) may be a gas valve assembly (1).

In some embodiments, the central flow diverter (13c) is configured to divert the first flow originating from the inlet port (2) and flowing through the first valve seat (5a) of the first pair of valve seats (5a, 5c) toward the second valve seat (5b) of the second pair of valve seats (5b, 5d) such that between the first valve seat (5a) and the second valve seat (5b) the first flow remains on the first side (11a) of the valve assembly (1).

In some embodiments, the first pair of valve members or poppets (4a, 4c) comprising a first valve member or first poppet (4a); wherein the central flow diverter (13c) is disposed adjacent to the first valve member or first poppet (4a); and the central flow diverter (13c) being configured to cooperate with the first valve member or first poppet (4a) to divert the first flow originating from the inlet port (2) and flowing through the first valve seat (5a) of the first pair of valve seats (5a, 5c) toward the second valve seat (5b) of the second pair of valve seats (5b, 5d).

In some embodiments, the first valve member or first poppet (4a) and the central flow diverter (13c) divert the first flow originating from the inlet port (2) and flowing through the first valve seat (5a) of the first pair of valve seats (5a, 5c) toward the second valve seat (5b) of the second pair of valve seats (5b, 5d).

In some embodiments, the central flow diverter (13c) is configured to cooperate with the first valve member or first poppet (4a) to redirect the first flow originating from the inlet port (2) and flowing through the first valve seat (5a) of the first pair of valve seats (5a, 5c) toward the second valve seat (5b) of the second pair of valve seats (5b, 5d).

In some embodiments, the first valve member or first poppet (4a) and the central flow diverter (13c) redirect the first flow originating from the inlet port (2) and flowing through the first valve seat (5a) of the first pair of valve seats (5a, 5c) toward the second valve seat (5b) of the second pair of valve seats (5b, 5d).

In some embodiments, the first pair of valve seats (5a, 5c) comprising a third valve seat (5c) disposed on the second side (11b) of the valve assembly (1); the second pair of valve seats (5b, 5d) comprising a fourth valve seat (5d) disposed on the second side (11b) of the valve assembly (1); and the central flow diverter (13c) is configured to divert a second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the central flow diverter (13c) directs a second flow originating from the inlet port (2) and flowing through the third valve seat (5c) of the first pair of valve seats (5a, 5c) toward the fourth valve seat (5d) of the second pair of valve seats (5b, 5d).

In some embodiments with a fourth valve seat (5d), the central flow diverter (13c) is configured to redirect a second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the central flow diverter (13c) redirects a second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the central flow diverter (13c) is configured to divert a second flow originating from the inlet port (2) and flowing through the third valve seat (5c) of the first pair of valve seats (5a, 5c) toward the fourth valve seat (5d) of the second pair of valve seats (5b, 5d) such that the first flow eventually reaches the outlet port (3).

The first flow is different from the second flow. The second flow is a second flow of a fluid such as a gaseous fluid.

In some embodiments having a fourth valve seat (5d), the central flow diverter (13c) is configured to divert the second flow originating from the inlet port (2) and flowing through the third valve seat (5c) of the first pair of valve seats (5a, 5c) toward the fourth valve seat (5d) of the second pair of valve seats (5b, 5d) such that between the third valve seat (5c) and the fourth valve seat (5d) the second flow remains on the second side (11b) of the valve assembly (1).

In some embodiments having a fourth valve seat (5d), the first pair of valve members or poppets (4a, 4c) comprises a first valve member or first poppet (4a); wherein the central flow diverter (13c) is disposed adjacent to the first valve member or first poppet (4a); and the central flow diverter (13c) is configured to cooperate with the first valve member or first poppet (4a) to divert the second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the first valve member or first poppet (4a) and the central flow diverter (13c) divert the second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the central flow diverter (13c) is configured to cooperate with the first valve member or first poppet (4a) to redirect the second flow originating from the inlet port (2) and flowing through the third valve seat (5c) of the first pair of valve seats (5a, 5c) toward the fourth valve seat (5d) of the second pair of valve seats (5b, 5d).

In some embodiments having a fourth valve seat (5d), the first valve member or first poppet (4a) and the central flow diverter (13c) redirect the second flow originating from the inlet port (2) and flowing through the third valve seat (5c) of the first pair of valve seats (5a, 5c) toward the fourth valve seat (5d) of the second pair of valve seats (5b, 5d).

In some embodiments, the inlet port (2) and the outlet port (3) define a downstream direction from the inlet port (2) to the outlet port (3); and the second pair of valve seats (5b, 5d) is disposed downstream of the first pair of valve seats (5a, 5c).

In some embodiments, the inlet port (2) and the outlet port (3) define a downstream direction from the inlet port (2) to the outlet port (3); and the second pair of valve seats (5b, 5d) is disposed in the downstream direction from the first pair of valve seats (5a, 5c).

In some embodiments, the first pair of valve seats (5a, 5c) is disposed closer to the inlet port (2) than to the outlet port (3); and the second pair of valve seats (5b, 5d) is disposed closer to the outlet port (3) than to the inlet port (2).

In some embodiments, the inlet port (2) and the outlet port (3) define a downstream direction from the inlet port (2) to the outlet port (3); and the second pair of valve members or poppets (4b, 4d) is disposed downstream of the first pair of valve members or poppets (4a, 4c).

In some embodiments, the inlet port (2) and the outlet port (3) define a downstream direction from the inlet port (2) to the outlet port (3); and the second pair of valve members or poppets (4b, 4d) is disposed in the downstream direction from the first pair of valve members or poppets (4a, 4c).

In some embodiments, the first pair of valve members or poppets (4a, 4c) is disposed closer to the inlet port (2) than to the outlet port (3); and the second pair of valve members or poppets (4b, 4d) is disposed closer to the outlet port (3) than to the inlet port (2).

In some embodiments, the second pair of valve seats (5b, 5d) comprises a fourth valve seat (5d) disposed on the second side (11b) of the valve assembly (1); the second pair of valve seats (5b, 5d) comprises a downstream web (14b) mechanically connecting the second valve seat (5b) to the fourth valve seat (5d); and the central flow diverter (13c) is secured relative to the downstream web (14b).

In some embodiments, the second pair of valve seats (5b, 5d) comprises a fourth valve seat (5d) disposed on the second side (11b) of the valve assembly (1); the second pair of valve seats (5b, 5d) comprises a downstream web (14b) mechanically connecting the second valve seat (5b) to the fourth valve seat (5d); and the central flow diverter (13c) is mounted to the downstream web (14b).

In some embodiments, the second pair of valve seats (5b, 5d) comprises a fourth valve seat (5d) disposed on the second side (11b) of the valve assembly (1); the second pair of valve seats (5b, 5d) comprises a downstream web (14b) mechanically connecting the second valve seat (5b) to the fourth valve seat (5d); and the central flow diverter (13c) is disposed in between the first pair of valve members or poppets (4a, 4c) and the downstream web (14b).

In some embodiments, the downstream web (14b) is a second web (14b).

In some embodiments, the central flow diverter (13c) comprises at least one of: a triangular prism having an edge, the edge pointing toward the inlet port (2), and a cone having an apex, the apex pointing toward the inlet port (2).

In some embodiments, the central flow diverter (13c) comprises at least one of: a triangular prism having an edge, the edge pointing toward the first valve member or first poppet (4a), and a cone having an apex, the apex pointing toward the first valve member or first poppet (4a).

In some embodiments having a downstream web (14b), the central flow diverter (13c) comprises at least one of: a triangular prism having a base, the base of the triangular prism pointing toward the downstream web (14b), and a cone having a base, the base of the cone pointing toward the downstream web (14b).

In some embodiments having a downstream web (14b), the central flow diverter (13c) comprises at least one of: a triangular prism having a base mounted to the downstream web (14b), and a cone having a base mounted to the downstream web (14b).

In some embodiments, there is an inlet flow diverter (13a) disposed in between the inlet port (2) and the first pair of valve members or poppets (4a, 4c).

In some embodiments having an inlet flow diverter (13a), the inlet flow diverter (13a) defines the first side (11a) of the valve assembly (1), the first side (11a) of the valve assembly (1) being disposed between the inlet flow diverter (13a) and the first side (8a) of the common housing; and the inlet flow diverter (13a) defines the second side (11b) of the valve assembly (1), the second side (11b) of the valve assembly (1) being disposed between the inlet flow diverter (13a) and the second side (8b) of the common housing.

In some embodiments having an inlet flow diverter (13a), the inlet flow diverter (13a) and the central flow diverter (13c) define the first side (11a) of the valve assembly (1), the first side (11a) of the valve assembly (1) being disposed between the inlet flow diverter (13a) and the first side (8a) of the common housing; and the inlet flow diverter (13a) and the central flow diverter (13c) define the second side (11b) of the valve assembly (1), the second side (11b) of the valve assembly (1) being disposed between the inlet flow diverter (13a) and the second side (8b) of the common housing.

In some embodiments, the inlet flow diverter (13a) is an inlet baffle member.

In some embodiments, the inlet flow diverter (13a) is configured to branch an inlet flow originating from the inlet port (2) into the first flow directed to the first side (11a) of the valve assembly (1) and into a second flow directed to the second side (11b) of the valve assembly (1).

In some embodiments, the inlet flow diverter (13a) is configured to bifurcate an inlet flow originating from the inlet port (2) into the first flow directed to the first side (11a) of the valve assembly (1) and into a second flow directed to the second side (11b) of the valve assembly (1).

The inlet flow may be an inlet flow of a fluid such as a gaseous fluid.

In some embodiments, the first pair of valve seats (5a, 5c) comprises a third valve seat (5c) disposed on the second side (11b) of the valve assembly (1); the first pair of valve seats (5a, 5c) comprises an upstream web (14a) mechanically connecting the first valve seat (5a) to the third valve seat (5c); and the inlet flow diverter (13a) is secured relative to the upstream web (14a).

In some embodiments, the first pair of valve seats (5a, 5c) comprises a third valve seat (5c) disposed on the second side (11b) of the valve assembly (1); the first pair of valve seats (5a, 5c) comprises an upstream web (14a) mechanically connecting the first valve seat (5a) to the third valve seat (5c); and the inlet flow diverter (13a) is mounted to the upstream web (14a).

In some embodiments, the first pair of valve seats (5a, 5c) comprises a third valve seat (5c) disposed on the second side (11b) of the valve assembly (1); the first pair of valve seats (5a, 5c) comprises an upstream web (14a) mechanically connecting the first valve seat (5a) to the third valve seat (5c); and the inlet flow diverter (13a) is disposed in between the inlet port (2) and the upstream web (14a).

In some embodiments, the upstream web (14a) is a first web (14a).

In some embodiments, the inlet flow diverter (13a) comprises at least one of: a triangular prism having an edge, the edge pointing toward the inlet port (2), and a cone having an apex, the apex pointing toward the inlet port (2).

In some embodiments, the inlet flow diverter (13a) comprises at least one of: a triangular prism having a base, the base of the triangular prism pointing toward the upstream web (14a), and a cone having a base, the base of the cone pointing toward the upstream web (14a).

In some embodiments, the inlet flow diverter (13a) comprises at least one of: a triangular prism having a base mounted to the upstream web (14a), and a cone having a base mounted to the upstream web (14a).

The present disclosure also deals with a combustion appliance comprising a valve assembly (1) incorporating teachings of the present disclosure.

It should be understood that the foregoing relates only to certain embodiments of the disclosure and that numerous changes can be made therein without departing from the scope of the disclosure as defined by the following claims. It should also be understood that the disclosure is not restricted to the illustrated embodiments and that various modifications can be made within the scope of the claims.

REFERENCE NUMERALS 1 valve assembly
2 inlet port
3 outlet port
4a-4d valve members or poppets
5a-5d valve seats
6a, 6b valve stems
7a-7f flow paths or fluid paths
8a, 8b sides of a common housing of the valve assembly
9a, 9b connectors
10 baffle assembly
11a, 11b sides of the valve assembly defined by the baffle assembly
12a, 12b protrusions
13a-13d flow diverters
14a, 14b webs

The invention claimed is:

1. A valve assembly comprising:
a common housing having a first side, a second side, an inlet port, and an outlet port;
a first pair of valve members or poppets and a second pair of valve members or poppets;
a first pair of valve seats for cooperation with the first pair of valve members or poppets; and
a second pair of valve seats for cooperation with the second pair of valve members or poppets;
a central flow diverter disposed in between the first pair of valve members or poppets and the second pair of valve seats, the central flow diverter defining a first side of the valve assembly disposed between the central flow diverter and the first side of the common housing, and a second side of the valve assembly disposed between the central flow diverter and the second side of the common housing;
the first pair of valve seats defining a first valve seat disposed on the first side of the valve assembly; and
the second pair of valve seats defining a second valve seat disposed on the first side of the valve assembly;
wherein the central flow diverter diverts a first flow originating from the inlet port and flowing through the first valve seat toward the second valve seat;
wherein the central flow diverter comprises at least one of: a triangular prism having an edge, the edge pointing toward the inlet port, or a cone having an apex, the apex pointing toward the inlet port.

2. The valve assembly according to claim 1, wherein the central flow diverter diverts the first flow such that between the first valve seat and the second valve seat the first flow remains on the first side of the valve assembly.

3. The valve assembly according to claim 1, wherein the central flow diverter is disposed adjacent to the first valve member or first poppet and is configured to cooperate with the first valve member or first poppet to divert the first flow originating from the inlet port and flowing through the first valve seat toward the second valve seat.

4. The valve assembly according to claim 1, wherein:
the first pair of valve seats comprises a third valve seat disposed on the second side of the valve assembly;
the second pair of valve seats comprises a fourth valve seat disposed on the second side of the valve assembly; and
the central flow diverter is configured to divert a second flow originating from the inlet port and flowing through the third valve seat toward the fourth valve seat of the second pair of valve seats.

5. The valve assembly according to claim 4, wherein the central flow diverter is configured to divert the second flow originating from the inlet port and flowing through the third valve seat toward the fourth valve seat such that between the third valve seat and the fourth valve seat the second flow remains on the second side of the valve assembly.

6. The valve assembly according to claim 4, wherein:
the central flow diverter is disposed adjacent to the first valve member or first poppet; and
the central flow diverter is configured to cooperate with the first valve member or first poppet to divert the second flow originating from the inlet port and flowing through the third valve seat toward the fourth valve seat.

7. The valve assembly according to claim 1, wherein:
the inlet port and the outlet port define a downstream direction from the inlet port to the outlet port; and
the second pair of valve seats is disposed downstream of the first pair of valve seats.

8. The valve assembly according to claim 1, wherein:
the inlet port and the outlet port define a downstream direction from the inlet port to the outlet port; and
the second pair of valve members or poppets is disposed downstream of the first pair of valve members or poppets.

9. The valve assembly according to claim 1, wherein:
the second pair of valve seats comprises a fourth valve seat disposed on the second side of the valve assembly;
the second pair of valve seats comprises a downstream web mechanically connecting the second valve seat to the fourth valve seat; and
the central flow diverter is secured relative to the downstream web.

10. A combustion appliance comprising a valve assembly according to claim 1.

11. A valve assembly comprising:
a common housing having a first side, a second side, an inlet port, and an outlet port;
a first pair of valve members or poppets and a second pair of valve members or poppets;
a first pair of valve seats for cooperation with the first pair of valve members or poppets; and
a second pair of valve seats for cooperation with the second pair of valve members or poppets;
a central flow diverter disposed in between the first pair of valve members or poppets and the second pair of valve seats, the central flow diverter defining a first side of the valve assembly disposed between the central flow diverter and the first side of the common housing, and a second side of the valve assembly disposed between the central flow diverter and the second side of the common housing;
the first pair of valve seats defining a first valve seat disposed on the first side of the valve assembly;

the second pair of valve seats defining a second valve seat disposed on the first side of the valve assembly;

wherein the central flow diverter diverts a first flow originating from the inlet port and flowing through the first valve seat toward the second valve seat; and an inlet flow diverter disposed in between the inlet port and the first pair of valve members or poppets;

wherein the inlet flow diverter comprises at least one of: a triangular prism having an edge, the edge pointing toward the inlet port, or a cone having an apex, the apex pointing toward the inlet port.

12. The valve assembly according to claim 11, wherein the inlet flow diverter is configured to branch an inlet flow originating from the inlet port into the first flow directed to the first side of the valve assembly and into a second flow directed to the second side of the valve assembly.

13. The valve assembly according to claim 11, wherein:

the first pair of valve seats comprises a third valve seat disposed on the second side of the valve assembly;

the first pair of valve seats comprises an upstream web mechanically connecting the first valve seat to the third valve seat; and the inlet flow diverter is secured relative to the upstream web.

* * * * *